UNITED STATES PATENT OFFICE.

EDUARD HEPP, OF FRANKFORT-ON-THE-MAIN, GERMANY, ASSIGNOR TO FARBWERKE, VORM. MEISTER, LUCIUS & BRÜNING, OF HÖCHST-ON-THE-MAIN, GERMANY, A CORPORATION OF GERMANY.

POLYAMIDOANTHRAQUINONE SULFO-ACID AND PROCESS OF MAKING SAME.

SPECIFICATION forming part of Letters Patent No. 711,310, dated October 14, 1902.

Application filed June 20, 1901. Serial No. 65,341. (Specimens.)

*To all whom it may concern:*

Be it known that I, EDUARD HEPP, Ph. D., a citizen of the Empire of Germany, residing at Frankfort-on-the-Main, Germany, have invented certain new and useful Improvements in Polyamidoanthraquinone Sulfo-Acids and Processes of Making Same, (for which I have received Letters Patent in England, No. 7,541, dated April 12, 1901; in France, No. 309,772, dated April 6, 1901, and in Germany, No. 127,341, dated February 22, 1901,) of which the following is a specification.

My invention relates to the production of polyamidoanthraquinone sulfo-acids by causing sulfonating agents to act on polyamidoanthraquinones which contain at least two amido groups in position 1:4 in one benzene nucleus of the anthraquinone. The new sulfo-acids are very valuable coloring-matters, dyeing unmordanted wool very fast violet to bluish shades.

It is well known that it has not yet been possible to introduce more than two nitro groups in the anthraquinone by treating it with nitric acid and that in this way a mixture of dinitroanthraquinones is obtained, the separation of which is described in the specification of United States Letters Patent No. 519,229. (See also German Patent No. 78,685.) The corresponding diamidoanthraquinones obtained by reducing these dinitroanthraquinones are called in United States Letters Patent No. 643,451 1:4[1] diamidoanthraquinone, (otherwise known as 1:5 diamidoanthraquinone,) 1:3 diamidoanthraquinone, (otherwise known as alpha-diamidoanthraquinone,) and 1:1[1] diamidoanthraquinone, (otherwise known as 1:8 or delta diamidoanthraquinone.) These diamidoanthraquinones have, therefore, according to the said patent the following formulæ:

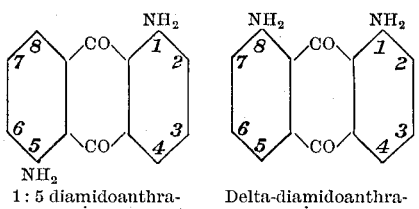

1:5 diamidoanthra-    Delta-diamidoanthra-
quinone.                  quinone.

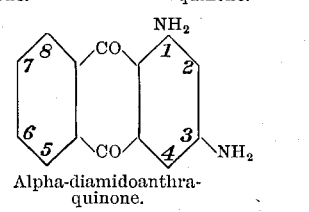

Alpha-diamidoanthra-
quinone.

They are transformed by sulfonating agents into sulfo-acids, which are known to be very poor coloring-matters, dyeing wool from acid-bath from red to violet-red shades. Other diamidoanthraquinones or diamidoanthraquinone sulfo-acids have hitherto not been mentioned in literature.

I have found that it is possible to obtain a new diamidoanthraquinone by starting from an acylated alpha-monoamidoanthraquinone, treating it with nitric acid, eliminating the acyl group, and reducing the nitroamidoanthraquinone thus obtained. This diamidoanthraquinone has the following formula:

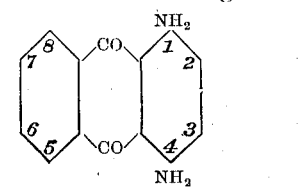

It is almost insoluble even in boiling water, but fairly soluble with a violet color in absolute alcohol or acetone, from which solvents it crystallizes in beautiful needles of metallic luster, having the melting-point 262° centigrade. It dissolves almost colorless in concentrated sulfuric acid, the solution becoming red when diluted with water, while the sulfate separates out in red-brown crystals. By treating this diamidoanthraquinone with sulfonating agents it is transformed into dyestuff sulfonic acids, which dye unmordanted wool from acid-bath bluish-violet shades distinguished by their fastness to light. If in the place of an acylated alpha-monoamidoanthraquinone I employ the acylated 1:5 diamidoanthraquinones, the result of treating them with two molecules of nitric acid and eliminating the acyl groups is a dinitrodiamidoanthraquinone of the following formula:

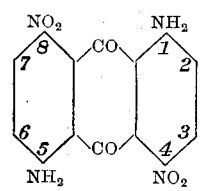

This is proved by the fact that this dinitrodiamidoanthraquinone is transformed into the well-known 1:5 dinitroanthraquinone if its two amido groups are caused to be substituted by hydrogen by dissolving it in concentrated sulfuric acid, treating the solution with nitrous acid, and heating then the resulting tetrazo compound with alcohol. The tetramidoanthraquinone obtained by reducing this dinitrodiamidoanthraquinone has, therefore, the formula

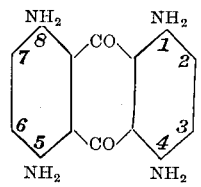

If otherwise the acyl derivatives of 1:8 diamidoanthraquinone are nitrated and the acyl groups then saponified, the resulting product is a dinitrodiamidoanthraquinone of the following formula:

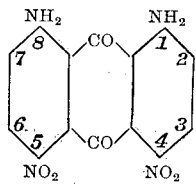

the tetramidoanthraquinones obtained by reducing the two aforesaid nitro derivatives having been proved to be identical. By treating the tetramidoanthraquinone with sulfonating agents dyestuff sulfonic acids are obtained which dye unmordanted wool from acid-bath pure-blue shades, being distinguished by their fastness to light. The by-products contained in the crude diamidoanthraquinone along with the 1:5 and 1:8 derivative can be transformed in the same way into polyamidoanthraquinones having similar properties to the above-defined tetramidoanthraquinone, so that no practical advantage is gained by using isolated bodies as the initial material.

In carrying out my invention I start generically from the acyl derivatives of alpha-amidoanthraquinones. (By "alpha-amidoanthraquinones" are meant alpha-monoamidoanthraquinone, 1:5 or 1:8 diamidoanthraquinone, or the mixture of amidoanthraquinones obtained by reducing the crude product of the nitration of anthraquinone.) By treating these acyl derivatives with nitric acid in suitable proportions I obtain the acylated nitroamidoanthraquinones. I then eliminate the acyl group by treating the acylated compounds with saponifying agents, such as acids or alkalies. I subject the resulting nitroamidoanthraquinones to the action of reducing agents, and finally I transform the polyamidoanthraquinones thus obtained into dyestuff sulfonic acids by the action of sulfonating agents. It is possible to invert the order of some of these operations, as the saponification of the acyl groups may take place either during or after the reduction. If instead of the tetramidoanthraquinones their acyl derivatives are subjected to the action of fuming sulfuric acid, the latter eliminates first the acyl groups and then effects the sulfonation. As acylated derivatives I preferably use oxamic acids obtained by treating amidoanthraquinones with oxalic acid. I do not, however, limit myself to their use, having also obtained very good results with acetylated and benzoylated derivatives. The said oxamic acids are brown-yellow powders almost insoluble in water, yielding when combined with alkalies salts readily soluble in water with a yellow color.

The following example will serve to further illustrate the manner in which my invention can be carried out in order to prepare the tetramidoanthraquinonesulfo-acids by means of the diamidoanthraquinone: Twenty-five kilos, by weight, of diamidoanthraquinone, obtained by reducing the crude dinitroanthraquinone, are heated in a vessel provided with a reflux condenser with one hundred kilos, by weight, of crystallized oxalic acid until none of the original material is left unchanged. The mass is then heated with water to remove any excess of oxalic acid, the residue is dried, and after being dissolved in four hundred and fifty kilos, by weight, of sulfuric acid of 66° Baumé the requisite calculated quantity of a mixture of sulfuric and nitric acids is slowly introduced into the solution cooled to —5° centigrade. After standing for some hours the nitration may be considered as complete and the solution is poured into ice-water. Thus a precipitate of an orange yellow color is separated, consisting of oxamic acids of dinitrodiamidoanthraquinones. These acids are little soluble in pure water, but readily soluble in a solution of sodium acetate and in cold solutions of alkali carbonates. If these solutions are heated with an excess of alkali carbonates or if even when cold caustic alkali is added, the dinitrodiamidoanthraquinones separate as red brilliant crystals. In order to reduce the dinitrodiamidoanthraquinones, thirty parts of this body are heated together with eighteen hundred parts of water, fifty parts of sodium sulfid, and three and one-half parts of sulfur, and the mixture is kept boiling for about two hours until no original material is left unchanged. The mixture is then allowed to cool. The tetramidoanthraquinone thus obtained as a dark-blue precipitate is filtered, washed, and dried. It is almost insoluble in water, but readily soluble in acetone or acetic acid to a blue solution, from which it crystallizes in needles of metallic luster when the solution is diluted with water. It dissolves in concentrated sulfuric acid to a colorless solution which becomes red on adding water, while the sulfates, little soluble under these conditions, separate as red-brown crystals. The hydrochlorids are also readily soluble in pure water, but little soluble in an excess of acid.

If instead of the dinitroamidoanthraquinone its oxamic acids are treated with alkali sulfids, they are dissolved to a green solution, which becomes blue on being heated, and when cold the alkali salts of the oxamic acids of tetramidoanthraquinones crystallize in the form of golden-bronze laminæ sparingly soluble in water. They are completely precipitated by common salt. By treating them with dilute mineral acids free oxamic acids are obtained as a precipitate still more insoluble in water, which may be purified by being dissolved in feebly-ammoniacal water and by again precipitating the solution with an acid. These acids dye wool in acid-baths blue shades, which, however, are not fast to rubbing. On boiling these oxamic acids with sufficiently-concentrated mineral acids the oxalic residue is eliminated and salts of tetramidoanthraquinone separate out.

To manufacture the tetramidoanthraquinone sulfonic acids, one part, by weight, of tetramidoanthraquinone is dissolved in six parts, by weight, of fuming sulfuric acid containing twenty per cent. of $SO_3$, the mixture being then slowly heated and maintained at a temperature of from 110° to 120° centigrade till a test portion diluted with water completely dissolves in sodium acetate. The liquid is then allowed to cool and is poured into water. The resulting dark-bluish-violet precipitate, which represents the new sulfo-acids, is collected on a filter and washed with water. It may directly be used for dyeing in form of paste; but it is preferable to convert it into an alkali salt by dissolving it in a slight excess of sodium acetate and by precipitating the blue solution with common salt. The product of these operations consists of a mixture of the sodium salts of different sulfonic acids, which need not be separated for their use in dyeing. They dye wool in an acid-bath pure-blue shades, which are differentiated by their greener tint from those obtained by means of tetramidoanthraquinones or their oxamic acids. The dyestuffs dye evenly well, and the dyes are thoroughly fast to milling, and especially distinguished by their fastness to light.

The free sulfo-acids when dry are in the form of a blackish powder. They are dissolved by anilin, pyridin, and dilute alkalies, such as ammonia liquor or carbonate-of-soda solution or caustic-soda lye, to a blue solution, the solution in caustic-soda lye turning red by means of zinc-dust and assuming after filtration the original coloration when exposed to air. The alkali salts are dark-blue powders soluble in water to a pure-blue coloration, which is changed into red by the addition of strong hydrochloric acid, the free sulfo-acids being separated as a dark-bluish-violet precipitate. By concentrated sulfuric acid they are dissolved, yielding an almost colorless solution, which practically shows a feeble bluish tint, the color of which changes first into violet and then into red, if the solution is diluted with water, the sulfo-acids being thus separated.

Having thus described my invention, I claim as new and desire to secure by Letters Patent—

1. The process for producing new polyamidoanthraquinone sulfo-acids containing at least two amido groups in position 1:4, which process consists in first treating acyl derivatives of alpha-amidoanthraquinones with nitric acid, secondly eliminating the acyl group by a saponifying agent, thirdly treating the nitroamidoanthraquinones thus obtained with reducing agents and finally transforming the polyamidoanthraquinones thus obtained into dyestuff sulfonic acids by the action of sulfonating agents, substantially as hereinbefore described.

2. The process for producing a new polyamidoanthraquinone sulfo-acid, which process consists in first treating acyl derivatives of diamidoanthraquinone with two molecules of nitric acid, secondly eliminating the acyl group by treating by a saponifying agent, thirdly reducing the dinitrodiamidoanthraquinone thus obtained with alkali sulfids, and finally transforming the tetramidoanthraquinone thus obtained into dyestuff sulfonic acids by the action of sulfonating agents, substantially as hereinbefore described.

3. The herein-described new dyestuff sulfonic acids, obtainable by sulfonating polyamidoanthraquinones containing at least two amido groups in position 1:4, which dyestuffs in form of their alkaline salts are soluble in water with a bluish-violet to pure-blue color becoming red by adding strong hydrochloric acid and yielding with concentrated sulfuric acid (66° Baumé specific gravity) an almost colorless solution, giving with dilute alkalies solutions becoming red by means of zinc-dust and assuming after filtration the original color when exposed to the air, and dyeing unmordanted wool in acid-baths from bluish-violet to pure-blue even shades which are distinguished by their fastness to light, substantially as hereinbefore described.

4. The herein-described new dyestuff sulfonic acid, obtainable by sulfonating tetramidoanthraquinone, which dyestuff in form of its alkaline salts is a dark-blue powder, soluble in water with a pure-blue color, which becomes red by adding strong hydrochloric acid, the free sulfo-acid being separated as a dark-bluish-violet precipitate, yielding with concentrated sulfuric acid an almost colorless solution, showing practically a feeble bluish tint, the color of which changes first into violet and then into red on the solution being diluted with water, the sulfo-acids being separated, giving with dilute alkalies solutions which become red by means of zinc-dust and assumes afterward the original color when exposed to the air, and dyeing unmordanted wool in an acid-bath pure-blue even shades which are distinguished by their fastness to light, substantially as hereinbefore described.

In testimony that I claim the foregoing as my invention I have signed my name in presence of two subscribing witnesses.

EDUARD HEPP.

Witnesses:
ALFRED BRISBOIS,
BERNHARD LYDECKER.